(12) United States Patent
Stocker et al.

(10) Patent No.: US 11,709,766 B2
(45) Date of Patent: *Jul. 25, 2023

(54) MOCKING ROBOTIC PROCESS AUTOMATION (RPAACTIVITIES FOR WORKFLOW TESTING

(71) Applicant: UiPath Inc., New York, NY (US)

(72) Inventors: Thomas Stocker, Vienna (AT); Christian Mayer, Vienna (AT); Gerd Weishaar, Vienna (AT)

(73) Assignee: UiPath Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/663,426

(22) Filed: May 14, 2022

(65) Prior Publication Data

US 2022/0269592 A1 Aug. 25, 2022

Related U.S. Application Data

(63) Continuation of application No. 17/247,164, filed on Dec. 2, 2020, now Pat. No. 11,334,471.

(51) Int. Cl.
  *G06F 11/36* (2006.01)
(52) U.S. Cl.
  CPC ...... *G06F 11/3684* (2013.01); *G06F 11/3664* (2013.01); *G06F 11/3688* (2013.01); *G06F 11/3696* (2013.01)
(58) Field of Classification Search
  CPC ....... G06F 11/36–3696; G06F 8/34–35; G06F 3/0482; G06F 9/451
  See application file for complete search history.

(56) References Cited

U.S. PATENT DOCUMENTS

| | | | | |
|---|---|---|---|---|
| 7,464,367 | B2 * | 12/2008 | Wain | G06F 8/34 717/113 |
| 7,890,868 | B2 * | 2/2011 | Shah | G06F 8/34 715/733 |
| 11,334,471 | B1 * | 5/2022 | Stocker | G06F 11/3684 |
| 2004/0032429 | A1 * | 2/2004 | Shah | G06F 3/0481 715/771 |
| 2005/0015745 | A1 * | 1/2005 | Wain | G06F 8/34 717/109 |
| 2018/0321830 | A1 * | 11/2018 | Calhoun | G06F 8/38 |

OTHER PUBLICATIONS

Tripathi. A.M., Learning Robotic Process Automation: Create Software robots and automate business processes with the leading RPA tool—UiPath, Birmingham, Packt, 2018, whole document.*
Anonymous, TIBCO BusinessWorksTM Container Edition Application Development, Software Release 2.5.3, TIBCO Software [online], May 2020 [retrieved from Internet: <URL: https://docs.tibco.com/pub/bwce/2.5.3/doc/pdf/TIB_bwce_2.5.3_application_development.pdf?id=11>, whole document.*

* cited by examiner

*Primary Examiner* — Todd Aguilera
(74) *Attorney, Agent, or Firm* — Law Office of Andrei D Popovici, PC

(57) ABSTRACT

A robot design interface comprises tools for testing a robotic process automation (RPA) workflow. Some embodiments automatically generate a mock workflow comprising a duplicate of the original workflow wherein a set of RPA activities are replaced with substitute activities for testing purposes. Some embodiments expose an intuitive interface co-displaying the substitute activities in parallel to their respective original activities and enabling a user to configure various mock parameters. Testing is then carried out on the mock workflow.

17 Claims, 13 Drawing Sheets

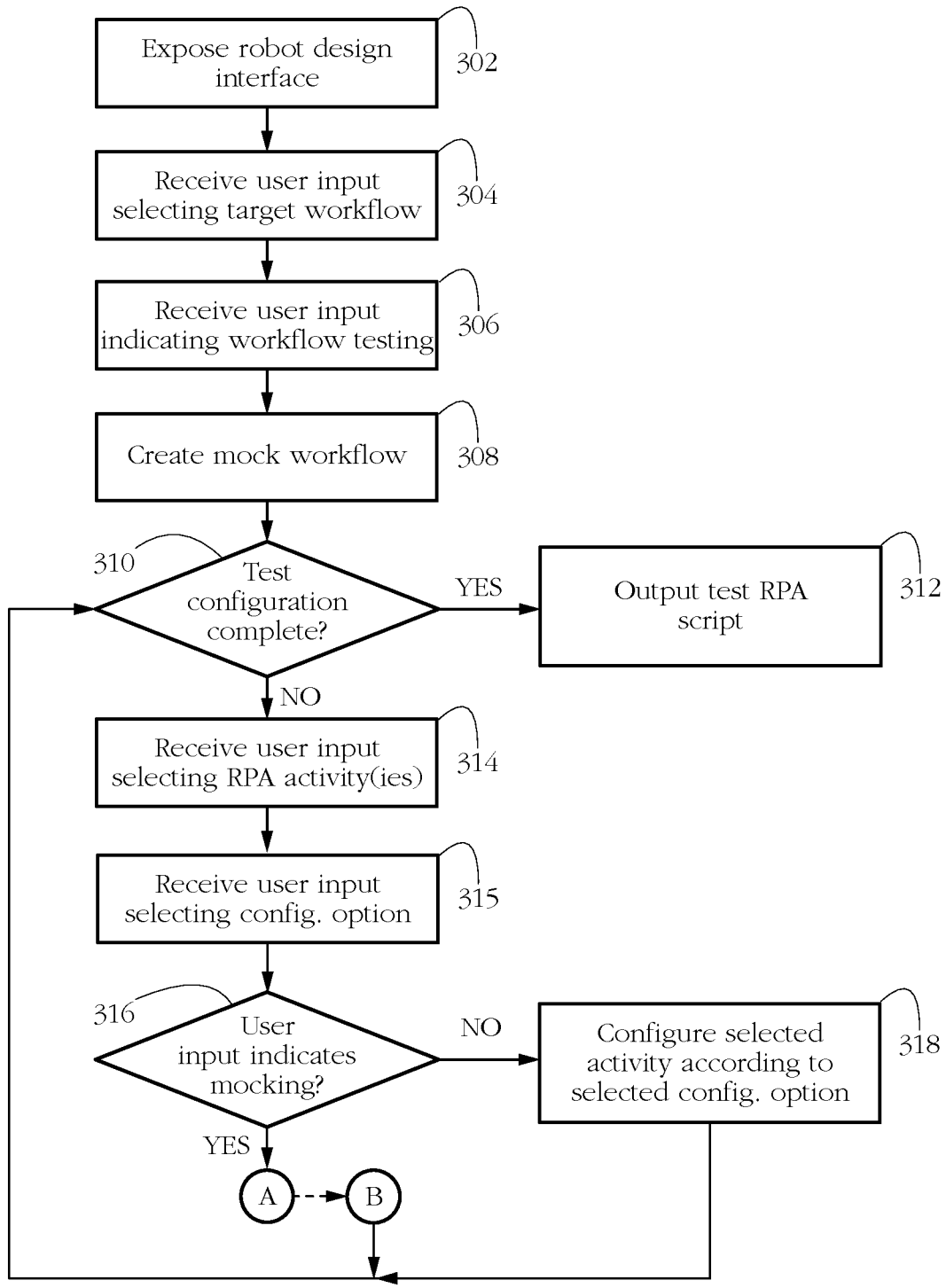
FIG. 12-A

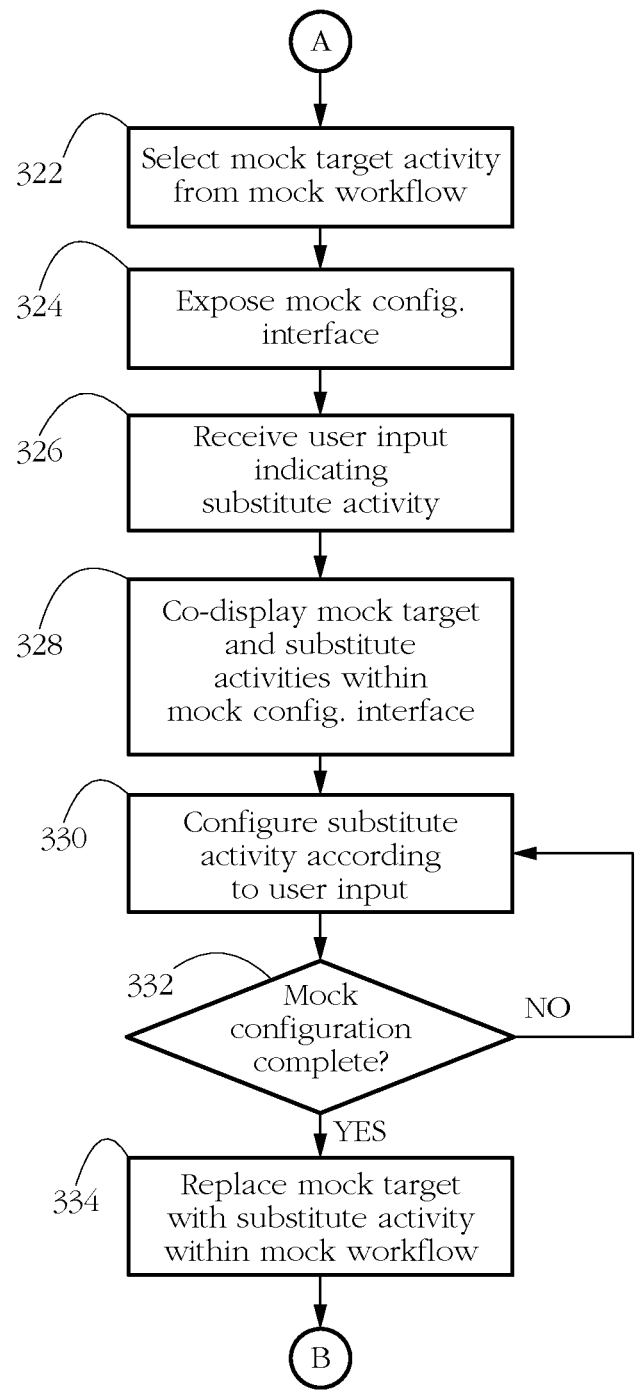
FIG. 12-B

MOCKING ROBOTIC PROCESS AUTOMATION (RPA)ACTIVITIES FOR WORKFLOW TESTING

RELATED APPLICATIONS

This application is a continuation of U.S. patent application Ser. No. 17/247,164, filed on Dec. 2, 2020, entitled "Mocking Robotic Process Automation (RPA) Activities for Workflow Testing," which is scheduled to issue on May 17, 2022 as U.S. Pat. No. 11,334,471, and which is herein incorporated by reference.

BACKGROUND

The invention relates to robotic process automation (RPA), and in particular to facilitating the testing and debugging of software robots.

RPA is an emerging field of information technology aimed at improving productivity by automating repetitive computing tasks, thus freeing human operators to perform more intellectually sophisticated and/or creative activities. Notable tasks targeted for automation include extracting structured data from documents and interacting with user interfaces, for instance to fill in forms, among others.

As the RPA technology matures and the complexity of automation increases, testing is becoming increasingly important to a successful implementation of RPA. Testing typically comprises executing the respective software under multiple test cases, comprising a variety of input data and parameter combinations, in an effort to uncover bugs and weaknesses before the respective software is sent to clients and/or applied to sensitive data. Software testing may be a particularly challenging activity, since it typically requires a profound understanding of the software being tested, of hardware and/or software characteristics of computer systems that the respective software is configured to interact with, as well as of the characteristics of the data that the respective software is supposed to process.

A distinct prong of RPA development is directed at simplifying the programming, management, and testing of software robots, with the ultimate goal of extending the reach of RPA technology to users that lack advanced programming skills or training. One way of making RPA more accessible is the development of RPA-oriented integrated development environments (IDEs) which allow the programming and/or debugging of robots via graphical user interface (GUI) tools, instead of coding per se. There is a strong interest in making such GUI tools as intuitive and user-friendly as possible, to attract a broad audience of developers.

SUMMARY

According to one aspect, a robotic process automation (RPA) method comprises employing at least one hardware processor of a computer system to select an RPA workflow for testing, the RPA workflow comprising a sequence of robotic activities wherein a first activity provides an input to a second activity. The method further comprises, in response to receiving a user input selecting a target subsequence of activities from the RPA workflow, the target subsequence including the first activity, creating a mock workflow for the RPA workflow, wherein the target subsequence of activities of the RPA workflow is replaced in the mock workflow with a substitute activity configured to supply a mock input to the second activity. The method further comprises outputting a computer-readable encoding of a test robot configured to execute the mock workflow, wherein executing the test robot comprises testing the RPA workflow for errors.

According to another aspect, a computer system comprises at least one hardware processor configured to select an RPA workflow for testing, the RPA workflow comprising a sequence of robotic activities wherein a first activity provides an input to a second activity. The at least one hardware processor is further configured, in response to receiving a user input selecting a target subsequence of activities from the RPA workflow, the target subsequence including the first activity, to create a mock workflow for the RPA workflow, wherein the target subsequence of activities of the RPA workflow is replaced in the mock workflow with a substitute activity configured to supply a mock input to the second activity. The at least one hardware processor is further configured to output a computer-readable encoding of a test robot configured to execute the mock workflow, wherein executing the test robot comprises testing the RPA workflow for errors.

According to another aspect, a non-transitory computer-readable medium stores instructions which, when executed by at least one hardware processor of a computer system, cause the computer system to select an RPA workflow for testing, the RPA workflow comprising a sequence of robotic activities wherein a first activity provides an input to a second activity. Executing the instructions further causes the computer system, in response to receiving a user input selecting a target subsequence of activities from the RPA workflow, the target subsequence including the first activity, to create a mock workflow for the RPA workflow, wherein the target subsequence of activities of the RPA workflow is replaced in the mock workflow with a substitute activity configured to supply a mock input to the second activity. Executing the instructions further causes the computer system to output a computer-readable encoding of a test robot configured to execute the mock workflow, wherein executing the test robot comprises testing the RPA workflow for errors.

BRIEF DESCRIPTION OF THE DRAWINGS

The foregoing aspects and advantages of the present invention will become better understood upon reading the following detailed description and upon reference to the drawings where:

FIG. 12-A shows an exemplary sequence of steps performed by an RPA design application according to some embodiments of the present invention.

FIG. 12-B shows another exemplary sequence of steps carried out by the RPA design application according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. The term 'database' is used herein to denote any organized, searchable collection of data. Computer-readable media encompass non-transitory media such as magnetic, optic, and semiconductor storage media (e.g. hard drives, optical disks, flash memory, DRAM), as well as communication links such as conductive cables and fiber optic links. The term 'symbol' herein encompasses various graphical representations of an RPA activity, such as a window, a container, a geometric shape, and an icon, among others. Two on-screen objects are said to have substantially the same size when their vertical sizes differ by at most 10%. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
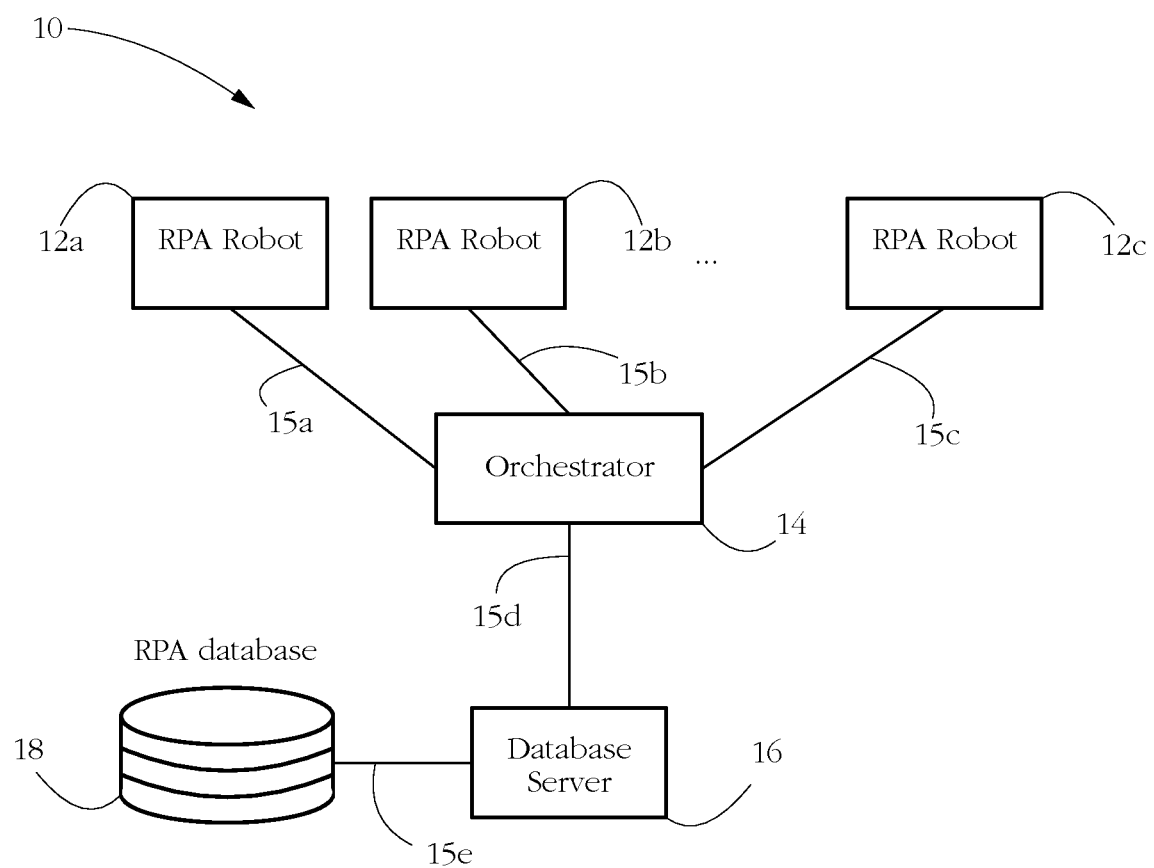
FIG. 1 shows an exemplary robotic process automation (RPA) environment according to some embodiments of the present invention.

FIG. 1 shows an exemplary robotic process automation (RPA) environment 10 according to some embodiments of the present invention. Environment 10 comprises various software components which collaborate to achieve the automation of a particular task. In an exemplary RPA scenario, an employee of a company uses a business application (e.g., word processor, spreadsheet editor, browser, email application) to perform a repetitive task, for instance to issue invoices to various clients. To actually carry out the respective task, the employee performs a sequence of operations/actions, which is herein deemed a process. Exemplary operations forming a part of an invoice-issuing process may include opening a Microsoft Excel® spreadsheet, looking up company details of a client, copying the respective details into an invoice template, filling out invoice fields indicating the purchased items, switching over to an email application, composing an email message to the respective client, attaching the newly created invoice to the respective email message, and clicking a 'Send' button. Various elements of RPA environment 10 may automate the respective process by mimicking the set of operations performed by the respective human operator in the course of carrying out the respective task.

Mimicking a human operation/action is herein understood to encompass reproducing the sequence of computing events that occur when a human operator performs the respective operation/action on the computer, as well as reproducing a result of the human operator's performing the respective operation on the computer. For instance, mimicking an action of clicking a button of a graphical user interface may comprise having the operating system move the mouse pointer to the respective button and generating a mouse click event, or may alternatively comprise toggling the respective GUI button itself to a clicked state.

Processes typically targeted for such automation include processing of payments, invoicing, communicating with business clients (e.g., distribution of newsletters and/or product offerings), internal communication (e.g., memos, scheduling of meetings and/or tasks), auditing, and payroll processing, among others. In some embodiments, a dedicated RPA design application 30 (FIG. 2) enables a human developer to design a software robot to implement a workflow that effectively automates a target process. A workflow typically comprises a sequence of custom automation steps, herein deemed activities. Each activity may include an action performed by the robot, such as clicking a button, reading a file, writing to a spreadsheet cell, etc. Activities may be nested and/or embedded. In some embodiments, RPA design application 30 exposes a user interface and set of tools that give the developer control of the execution order and the relationship between activities of a workflow. One commercial example of an embodiment of RPA design application 30 is UiPath STUDIOX™.

Some types of workflows may include, but are not limited to, sequences, flowcharts, finite state machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Figure 2:
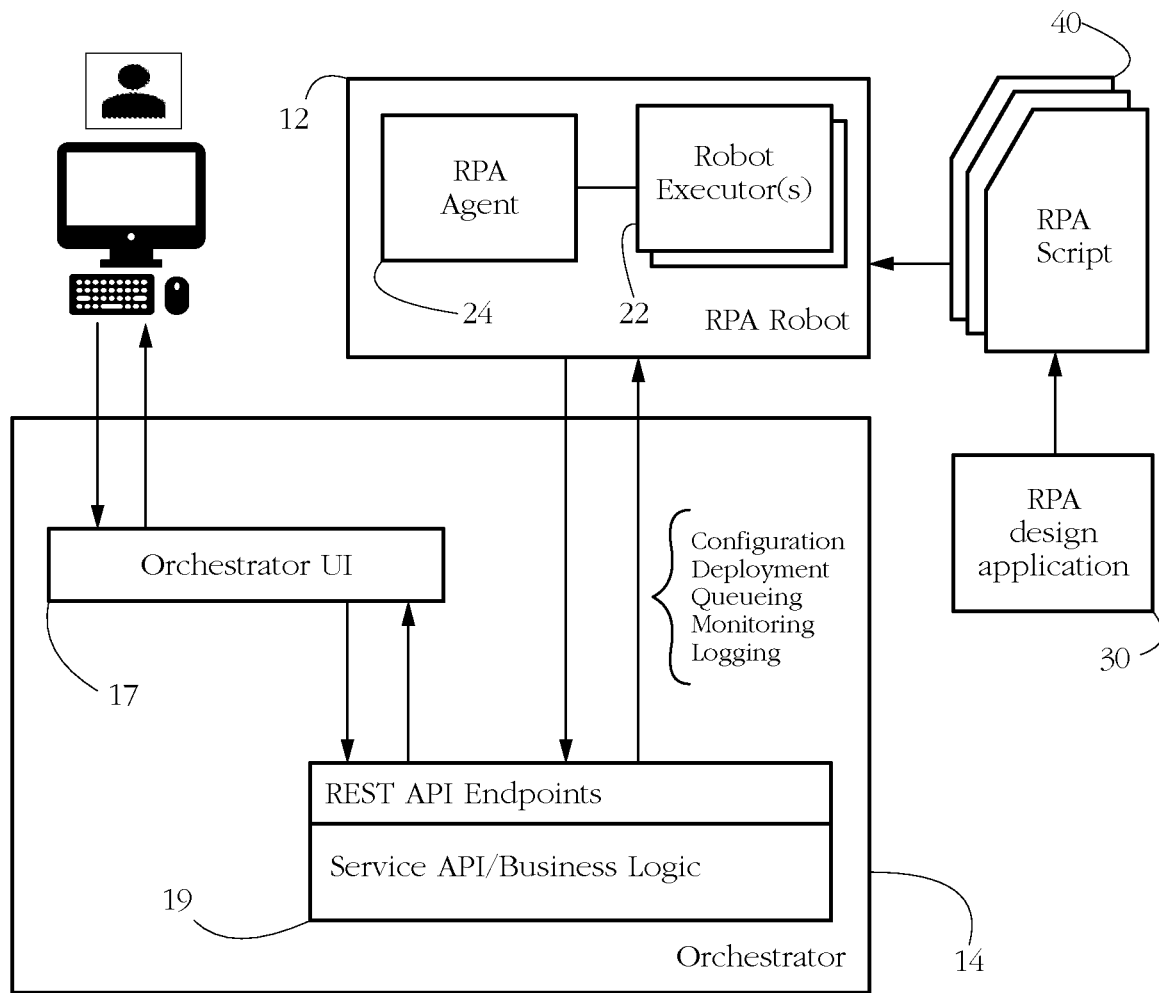
FIG. 2 illustrates exemplary components and operation of an RPA robot and orchestrator according to some embodiments of the present invention.

Once a workflow is developed, it may be encoded in computer-readable form as a set of RPA scripts 40 (FIG. 2). RPA scripts 40 may be formulated according to any data specification known in the art, for instance in a version of an extensible markup language (XML), JAVASCRIPT® Object Notation (JSON), or a programming language such as C#, VISUAL BASIC®, JAVA®, etc. Alternatively, RPA scripts 40 may be formulated in an RPA-specific version of bytecode, or even as a sequence of instructions formulated in a natural language such as English, Spanish, Japanese, etc. In some embodiments, scripts 40 are pre-compiled into a set of native processor instructions (e.g., machine code).

A skilled artisan will appreciate that RPA design application 30 may comprise multiple components/modules, which may execute on distinct physical machines. In one such example illustrating a cloud computing embodiment of the present invention, RPA design application 30 may execute in a client-server configuration, wherein one component of application 30 may expose a robot design interface to a user of a client computer, and another component of application 30 executing on a server computer may assemble the robot workflow and formulate/output RPA script 40. For instance, a developer may access the robot design interface via a web browser executing on the client computer, while the software processing the user input received at the client computer actually executes on the server computer.

Once formulated, scripts 40 may be executed by a set of robots 12*a-c* (FIG. 1), which may be further controlled and coordinated by an orchestrator 14. Robots 12*a-c* and orchestrator 14 may each comprise a plurality of computer programs, which may or may not execute on the same physical machine. Exemplary commercial embodiments of robots 12*a-c* and orchestrator 14 include UIPATH ROBOTS™ and UIPATH ORCHESTRATOR™, respectively. Types of robots 12*a-c* include, but are not limited to, attended robots, unattended robots, development robots (similar to unattended robots, but used for development and testing purposes), and nonproduction robots (similar to attended robots, but used for development and testing purposes).

Attended robots are triggered by user events and/or commands and operate alongside a human operator on the same computing system. In some embodiments, attended robots can only be started from a robot tray or from a command prompt and thus cannot be controlled from orchestrator 14 and cannot run under a locked screen, for example. Unattended robots may run unattended in remote virtual environments and may be responsible for remote execution, monitoring, scheduling, and providing support for work queues.

Orchestrator 14 may have various capabilities including, but not limited to, provisioning, deployment, configuration, queueing, monitoring, logging, and/or providing interconnectivity for robots 12*a-c*. Provisioning may include creating and maintaining connections between robots 12*a-c* and orchestrator 14. Deployment may include ensuring the correct delivery of software (e.g, RPA scripts 40) to robots 12*a-c* for execution. Configuration may include maintenance and delivery of robot environments and workflow configurations. Queueing may include providing management of queues and queue items. Monitoring may include keeping track of robot state and maintaining user permissions. Logging may include storing and indexing logs to a database and/or another storage mechanism (e.g., SQL, ELASTICSEARCH®, REDIS®). Orchestrator 14 may further act as a centralized point of communication for third-party solutions and/or applications.

FIG. 2 shows exemplary components of a robot 12 and orchestrator 14 according to some embodiments of the present invention. An exemplary RPA robot is constructed using a WINDOWS® Workflow Foundation Application Programming Interface from Microsoft, Inc. Robot 12 may comprise a set of executors 22 and an RPA agent 24. Robot executors 22 are configured to receive RPA script 40 indicating a sequence of activities that mimic the actions of a human operator carrying out a business process, and to actually perform the respective sequence of activities on the respective client machine. In some embodiments, robot executor(s) 22 comprise an interpreter (e.g., a just-in-time interpreter or compiler) configured to translate RPA script 40 into a runtime package comprising processor instructions for carrying out the operations described in the respective script. Executing script 40 may thus comprise executor(s) 22 translating RPA script 40 and instructing a processor of the respective host machine to load the resulting runtime package into memory and to launch the runtime package into execution.

RPA agent 24 may manage the operation of robot executor(s) 22. For instance, RPA agent 24 may select tasks/scripts for execution by robot executor(s) 22 according to an input from a human operator and/or according to a schedule. Agent 24 may start and stop jobs and configure various operational parameters of executor(s) 22. When robot 12 includes multiple executors 22, agent 24 may coordinate their activities and/or inter-process communication. RPA agent 24 may further manage communication between RPA robot 12 and orchestrator 14 and/or other entities.

In some embodiments executing in a WINDOWS® environment, robot 12 installs a Microsoft WINDOWS® Service Control Manager (SCM)-managed service by default. As a result, such robots can open interactive WINDOWS® sessions under the local system account and have the processor privilege of a WINDOWS® service. For instance, a console application may be launched by a SCM-managed robot. In some embodiments, robot 12 can be installed at a user level of processor privilege (user mode, ring 3.) Such a robot has the same rights as the user under which the respective robot has been installed. For instance, such a robot may launch any application that the respective user can. On computing systems that support multiple interactive sessions running simultaneously (e.g., WINDOWS SERVER® 2012), multiple robots may be running at the same time, each in a separate WINDOWS® session, using different usernames.

In some embodiments, robot 12 and orchestrator 14 may execute in a client-server configuration. It should be noted that the client side, the server side, or both, may include any desired number of computing systems (e.g., physical or virtual machines) without deviating from the scope of the invention. In such configurations, robot 12 including executor(s) 22 and RPA agent 24 may execute on a client side. Robot 12 may run several workflows concurrently. RPA agent 24 (e.g., a WINDOWS® service) may act as a single client-side point of contact of executors 22. Agent 24 may further manage communication between robot 12 and orchestrator 14. In some embodiments, communication is initiated by agent 24, which may open a WebSocket channel to orchestrator 14. Agent 24 may subsequently use the channel to transmit notifications regarding the state of each executor 22 to orchestrator 14. In turn, orchestrator 14 may use the channel to transmit acknowledgements, job requests, and other data such as RPA scripts 40 to robot 12.

Orchestrator 14 may execute on a server side, possibly distributed over multiple physical machines. In one such embodiment, orchestrator 14 may include an orchestrator user interface (UI) 17 which may be a web application, and a set of service modules 19. Service modules 19 may further include a set of Open Data Protocol (OData) Representational State Transfer (REST) Application Programming Interface (API) endpoints, and a set of service APIs/business logic. A user may interact with orchestrator 14 via orchestrator UI 17 (e.g., by opening a dedicated orchestrator interface on a browser), to instruct orchestrator 14 to carry out various actions, which may include for instance starting jobs on robot 12, creating robot groups, assigning workflows to robots, adding/removing data in queues, scheduling jobs to run unattended, analyzing logs per robot or workflow, etc. Orchestrator UI 17 may use Hypertext Markup Language (HTML), JAVASCRIPT® (JS), or any other data format known in the art.

Orchestrator 14 may carry out actions requested by the user by selectively calling service APIs/business logic. In addition, orchestrator 14 may use the REST API endpoints to communicate with robot 12. The REST API may include configuration, logging, monitoring, and queueing functionality. The configuration endpoints may be used to define and configure application users, permissions, robots, assets, releases, etc. Logging REST endpoints may be used to log different information, such as errors, explicit messages sent by the robots, and other environment-specific information, for instance. Deployment REST endpoints may be used by robots to query the version of RPA script 40 to be executed. Queueing REST endpoints may be responsible for queues and queue item management, such as adding data to a queue, obtaining a transaction from the queue, setting the status of a transaction, etc. Monitoring REST endpoints may monitor the web application component of orchestrator 14 and RPA agent 24.

In some embodiments, RPA environment 10 (FIG. 1) further comprises a database server 16 connected to an RPA database 18. In an embodiment wherein server 16 is provisioned on a cloud computing platform, server 16 may be embodied as a database service, e.g., as a client having a set of database connectors. Database server 16 is configured to selectively store and/or retrieve data related to RPA environment 10 in/from database 18. Such data may include configuration parameters of various robots 12a-c, robot groups, as well as data characterizing workflows executed by various robots, and data characterizing users, roles, schedules, queues, etc. Another exemplary category of data stored and/or retrieved by database server 16 includes data characterizing the current state of each executing robot. Yet another exemplary category of data includes messages logged by various robots during execution. Database server 16 and database 18 may employ any data storage protocol and format known in the art, such as structured query language (SQL), ELASTICSEARCH®, and REDIS®, among others. In some embodiments, data is gathered and managed by orchestrator 14, for instance via logging REST endpoints. Orchestrator 14 may further issue structured queries to database server 16.

In some embodiments, RPA environment 10 (FIG. 1) further comprises communication channels/links 15a-e interconnecting various members of environment 10. Such links may be implemented according to any method known in the art, for instance as virtual network links, virtual private networks (VPN), or end-to-end tunnels. Some embodiments further encrypt data circulating over some or all of links 15a-e.

Figure 3:
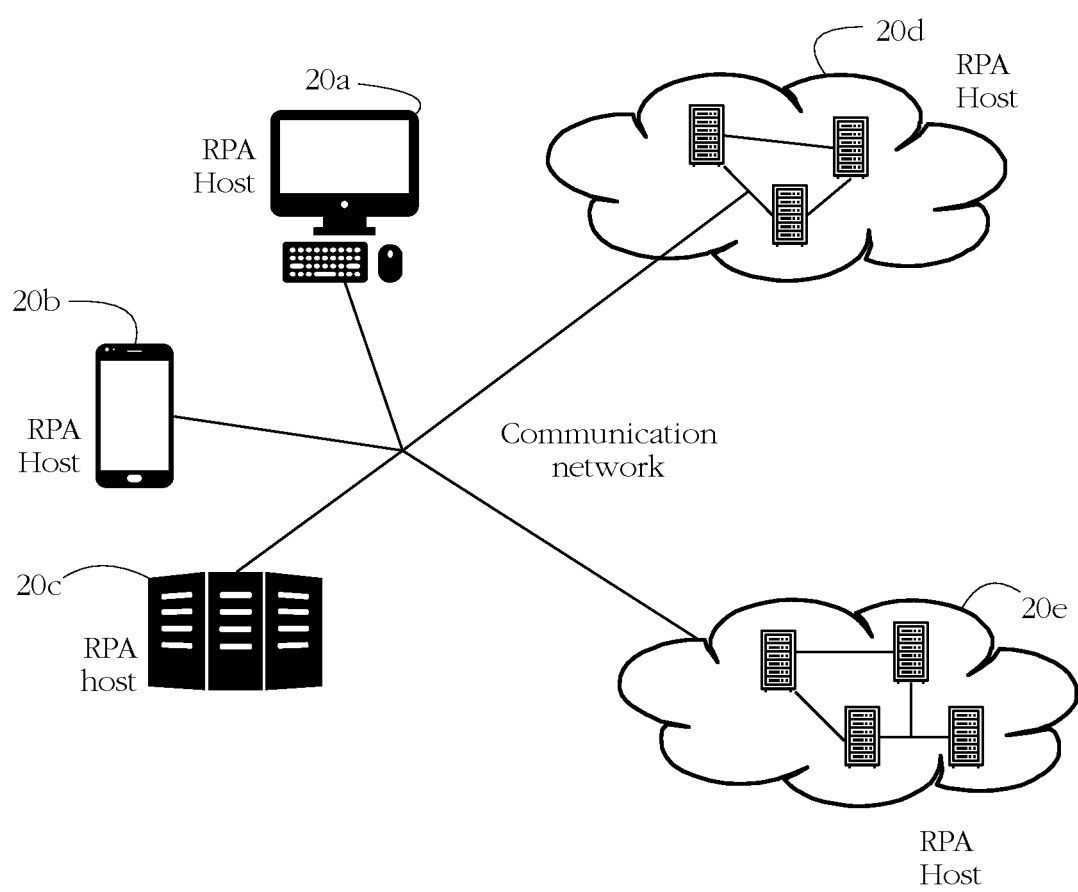
FIG. 3 shows a variety of RPA host systems according to some embodiments of the present invention.

A skilled artisan will understand that various components of RPA environment 10 may be implemented and/or may execute on distinct host computer systems (physical appliances and/or virtual machines.) FIG. 3 shows a variety of such RPA host systems 20a-e according to some embodiments of the present invention. Each host system 20a-e represents a computing system (e.g. an individual computing appliance, or a set of interconnected computers) having at least a hardware processor, a memory unit and a network adapter enabling the respective RPA host to connect to a computer network and/or to other computing devices. Exemplary RPA hosts 20a-c include personal computers, laptop and tablet computers, mobile telecommunication devices (e.g., smartphones), and corporate mainframe computers, among others. Other exemplary hosts illustrated as hosts 20d-e include cloud computing platforms such as server farms operated by AMAZON AWS® and MICROSOFT AZURE®. A cloud computing platform comprises a plurality of interconnected server computer systems centrally-managed according to a platform-specific protocol. Clients may interact with such cloud computing platforms using platform-specific interfaces/software layers/libraries (e.g., software development kits—SDKs, plugins, etc.) and/or a platform-specific syntax of commands. Exemplary platform-specific interfaces include the AZURE® SDK and AWS® SDK, among others.

Figure 4:
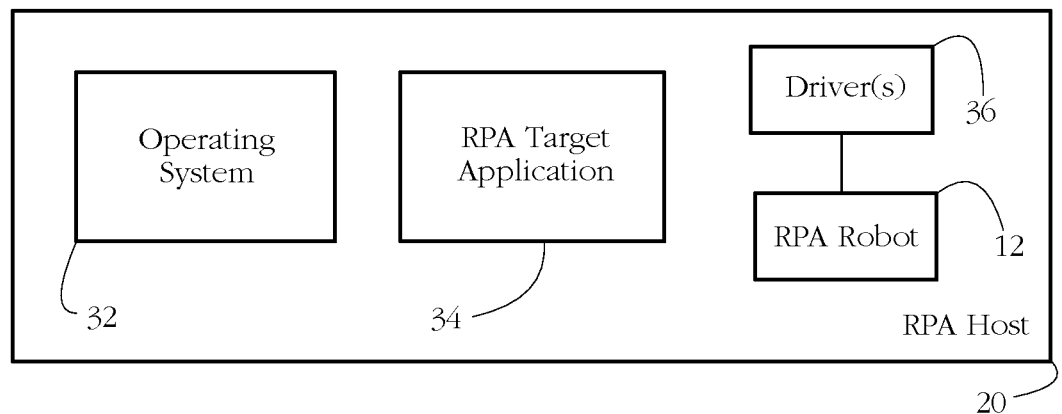
FIG. 4 shows exemplary RPA components executing on an RPA host according to some embodiments of the present invention.

FIG. 4 shows exemplary software executing on an RPA host 20 according to some embodiments of the present invention. The illustrated RPA host 20 generically represents any of RPA hosts 20a-e in FIG. 3. In some embodiments, beside an RPA robot 12, RPA host 20 executes an operating system (OS) 32 and an instance of an RPA target application 34, i.e., the software application targeted for automation by robot 12. In some embodiments that employ hardware virtualization technologies, some or all of the illustrated components may execute within a virtual machine (VM).

OS 32 may comprise any widely available operating system such as Microsoft WINDOWS®, MACOS®, LINUX®, IOS®, or ANDROID®, among others, comprising a software layer that interfaces between application 34 and the hardware of RPA host 20. RPA target application 34 generically represents any computer program used by a human operator to carry out a task. Exemplary applications 34 include, among others, a word processor, a spreadsheet application, a graphics application, a browser, a social media application, a gaming application, and an electronic communication application.

In some embodiments, robot 12 carries out user interface automation activities by interfacing with a set of drivers 36 executing on the respective host. Driver(s) 36 generically represent software modules that carry low-level operations such as moving a cursor on screen, registering and/or executing mouse, keyboard, and/or touchscreen events, detecting a current posture/orientation of a handheld device, detecting a current accelerometer reading, taking a photograph with a smartphone camera, etc. Some such drivers 36 form a part of operating system 32. Others may implement various application-specific aspects of a user's interaction with complex target applications 34 such as SAP®, CITRIX® virtualization software, EXCEL®, etc. Such drivers 36 may include, for instance, browser drivers, virtualization drivers, and enterprise application drivers, among others. Other exemplary drivers 36 include the Microsoft WinAppDriver, XCTest drivers from Apple, Inc., and UI Automator drivers from Google, Inc.

Figure 5:
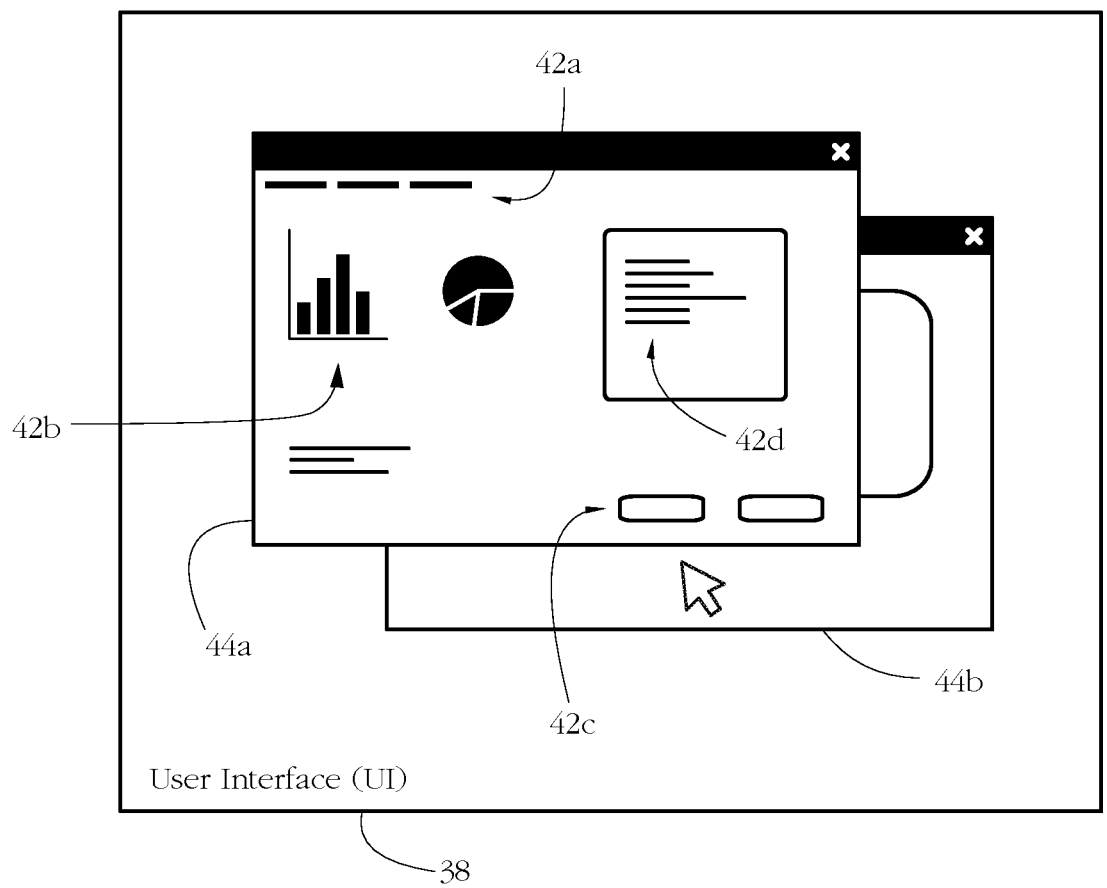
FIG. 5 shows an exemplary user interface (UI) having a plurality of UI elements according to some embodiments of the present invention.

RPA target application 34 is typically configured to expose a user interface (UI). A user interface is a computer interface that enables human-machine interaction, e.g., an interface configured to receive user input and to respond to the respective input. A common example of user interface is known as a graphical user interface (GUI), which enables human-machine interaction via a set of visual elements displayed to the user. FIG. 5 shows such an exemplary UI 38 according to some embodiments of the present invention. Illustrative UI 38 has a set of exemplary windows 44a-b and a set of exemplary UI elements including a menu indicator 42a, an icon 42b, a button 42c, and a text box 42d. Other exemplary UI elements comprise, among others, a window, a label, a form, an individual form field, a toggle, a link (e.g., a hyperlink, hypertext, or a uniform resource identifier). UI elements may display information, receive input (text, mouse events), and/or control a functionality of software and/or the respective computing device.

Some UI elements are interactive in the sense that acting on them (e.g., clicking button 42c) triggers a behavior/reaction. Such behaviors/reactions are typically specific to the respective element or to a group of elements. For instance, clicking a save button produces a different effect to clicking a print button. The same keyboard shortcut (e.g., Ctrl-G) may have one effect when executed in one window/application, and a completely different effect when executed in another window/application. So, although the operation/action/activity is the same (executing a click, pressing a combination of keyboard keys, writing a sequence of characters, etc.), the result of the respective action may depend substantially on the operand of the respective operation. An operand is herein defined as the UI element that is acted upon by a current activity such as a click or a keyboard event, or stated otherwise, the UI element selected to receive the respective user input.

To indicate an operand for each activity, some embodiments use a selector data structure that selectively identifies the respective UI element among the plurality of elements of UI interface 38. In one exemplary embodiment, the selector indicates a position of the respective UI element in an object hierarchy of UI interface 38, such as a GUI tree or DOM model. GUI object hierarchies may be encoded in computer-readable form in a language such as XML or JSON, among others. One exemplary selector may indicate that the respective UI element is a form field of a specific form displayed within a specific UI window. The selector of a target UI element may be specified at design time by including an encoding of the respective selector in an RPA script configured to carry out an activity on the respective UI element. At runtime, robot 12 may attempt to identify the operand within a runtime instance of the target UI according to the respective selector and possibly according to other information such as an image of the respective UI element and/or a text displayed on the respective UI element.

Figure 6:
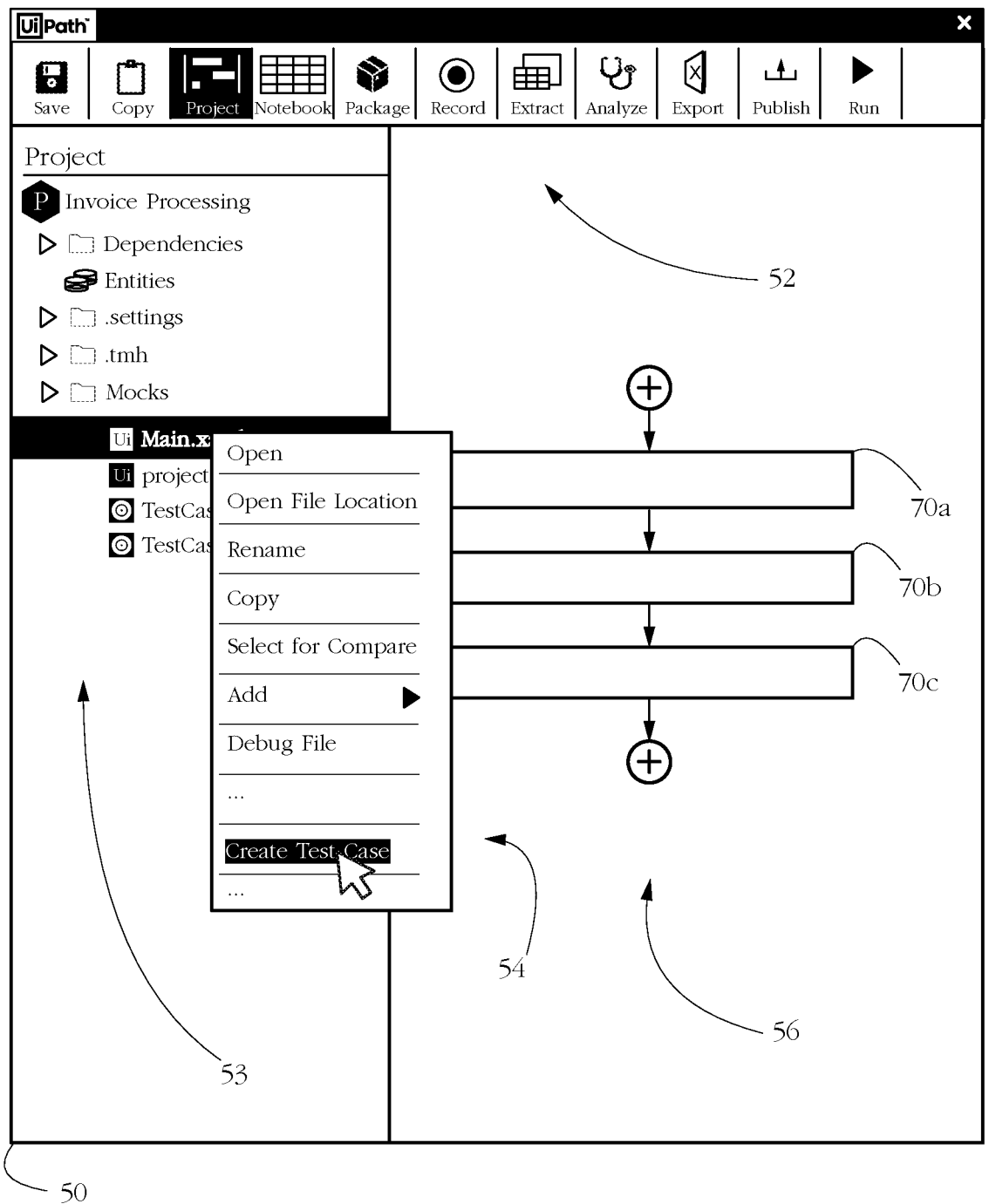
FIG. 6 shows an exemplary robot design interface comprising workflow testing functionality according to some embodiments of the present invention.

FIG. 6 shows an exemplary robot design interface 50 exposed by RPA design application 30 according to some embodiments of the present invention. Interface 50 may be configured to enable a user to program RPA robot 12 by using a set of intuitive visual tools, instead of coding per se. For instance, interface 50 may enable the user to build a robot from a set of individual building blocks assembled in sequence. Such building blocks may comprise various activities, such as opening an instance of RPA target application 34, clicking on a UI element of application 34, filling out a form field, etc.

In one example illustrated in FIG. 6, robot design interface 50 comprises a main menu/ribbon 52 including a plurality of menu items for opening, saving, and managing robot projects, adding, organizing, and configuring robotic activities, recording a set of user actions to be reproduced by robot 12, and executing robot 12, among others. For convenience, menu 52 may be organized into a hierarchy of submenus. For instance, menu 52 may comprise a dedicated activity submenu enabling the user to select among a plurality of available robotic activities for adding to the current workflow. Exemplary activities included in the activity submenu include executing a mouse click, copying data from a UI element, pasting data into a UI element, opening a disk file, and navigating to a URL, among others. The activity submenu may be further split into multiple submenus, organized according to a type of activity and/or according to a type of RPA target application. For instance, web browsing activities may be grouped together in a separate submenu distinct from another submenu listing activities for interacting with spreadsheets, etc. Design interface 50 may further expose a project management area 53 giving the developer access to various aspects of a current project, such as a list of dependencies and various settings.

In some embodiments, robot design interface 50 further comprises a workflow area configured to display a workflow 56 comprising a graphical representation of software robot 12 as a set of robotic activities (e.g., opening a file, clicking a hyperlink, etc.) arranged in sequence according to a desired order of execution of the respective activities. Each activity may be graphically represented by a symbol, while relationships between activities may be represented using other visual aids such as arrows, lines, etc. In the example of FIG. 6, individual activities are symbolized by activity containers 70a-c connected by arrows in the manner of a computer flowchart. Activity containers may be nested, i.e., an individual activity container 70a-c may in turn comprise multiple activities arranged in sequence, each sub-activity represented by its own symbol (e.g., activity container), as further illustrated below. In some embodiments, the user may access each individual activity/group by selecting the respective symbol, for instance by clicking inside the respective activity container. In response to receiving such a click, some embodiments may expose an activity configuration interface enabling the developer to configure various aspects of the respective activity or group of activities. Workflow 56 may be further manipulated for instance by dragging individual activity containers to change the order of execution, etc.

Figure 7:
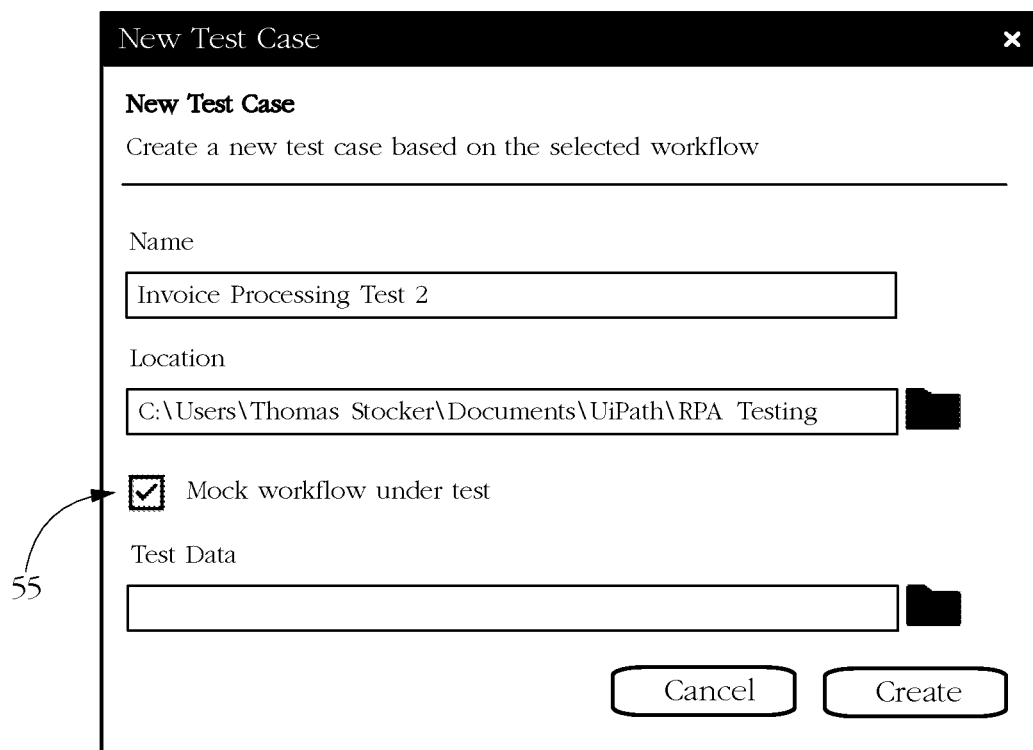
FIG. 7 shows an exemplary interface for creating a mock workflow according to some embodiments of the present invention.

In some embodiments, project management area 53 may expose a set of controls for testing and/or debugging the current project/software robot. In one example illustrated in FIG. 6, such robot testing controls are exposed within a project management submenu 54. Clicking on the 'Create Test Case' menu item may further display a user interface as shown in FIG. 7, enabling the developer to set test parameters such as a disk location of a test workflow (RPA script and various associated assets) and to provide test input, among others.

A dedicated control 55 may enable the developer to indicate whether the respective test uses mocking. In some embodiments, activating control 55 causes RPA design application 30 to create a duplicate of the respective workflow for testing purposes. Such a duplicate workflow is herein deemed a mock workflow. Using a duplicate/clone workflow for testing may enable the developer to test various aspects of the respective workflow without affecting the original workflow. Stated otherwise, any tests of the respective robot are carried out on the mock workflow instead of the actual 'clean' workflow under development. Such a testing/debugging strategy may save the developer time and facilitate change tracking. Creating mock workflows may further enable the developer to test various aspects of the workflow independently of each other—each distinct mock workflow may for instance check a distinct part or a distinct activity of the respective workflow. In contrast, leaving control 55 unchecked may run testing directly on the original workflow.

Figure 8:
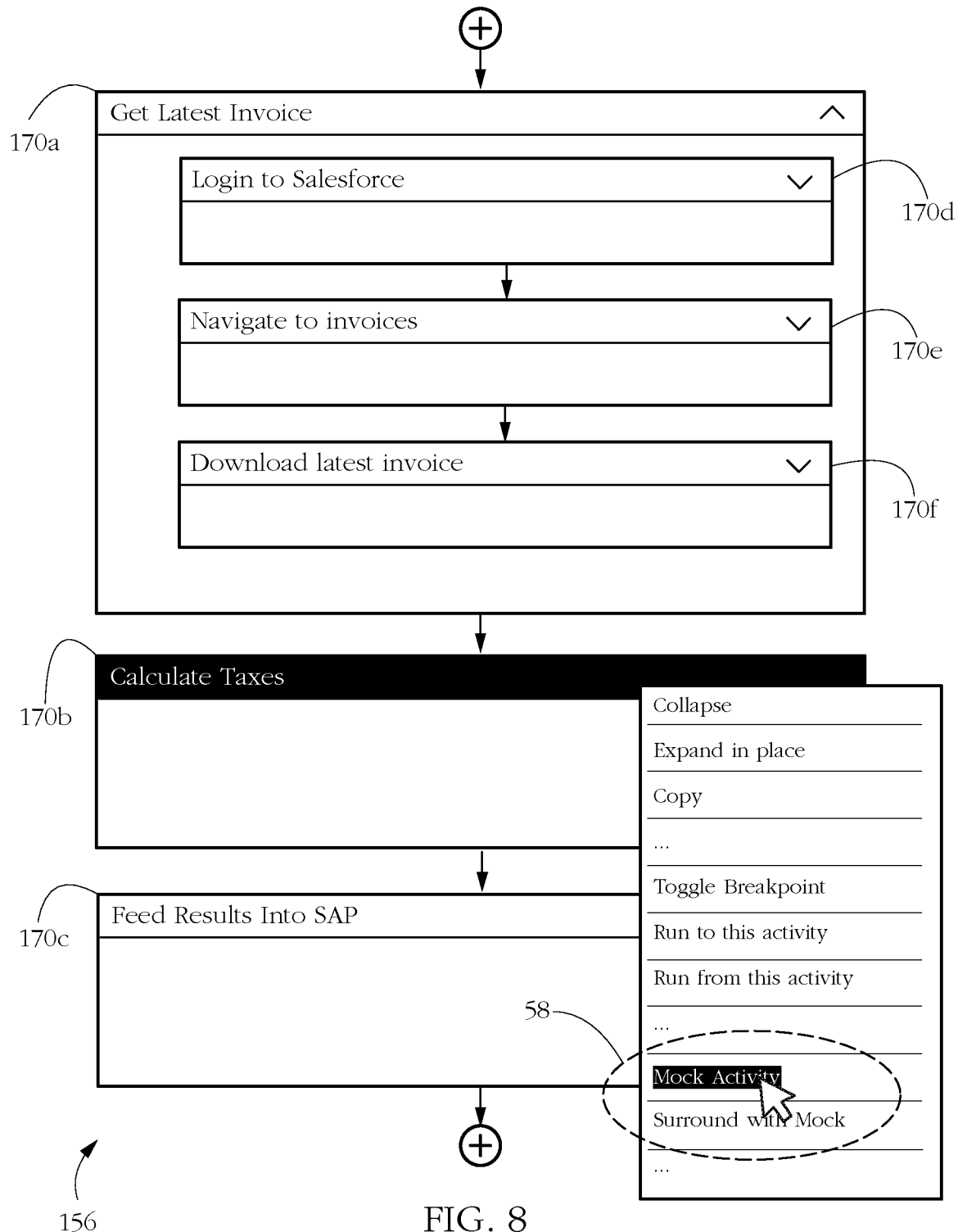
FIG. 8 illustrates an exemplary mock workflow and an exemplary interface for selectively mocking RPA activities according to some embodiments of the present invention.

In response to creating a mock workflow, some embodiments instantiate a robot testing interface (e.g., a GUI) displaying the respective mock workflow. FIG. 8 illustrates such an exemplary display of a robot testing interface, showing an exemplary mock workflow 156 comprising a sequence of activity containers 170*a-c*. In the current example, robot 12 is configured to obtain an invoice, calculate taxes associated with the respective invoice, and enter a result of the tax calculation into an SAP® data management system. Activity container 170*a* further comprises a plurality of activity containers 170*d-f*, each of which may represent an individual activity or an activity subgroup. For instance, obtaining the latest invoice may comprise remotely logging into an accounting database, identifying the most recent invoice, and downloading it.

In some embodiments, the robot testing interface allows the developer to select an activity or a group of activities by clicking the respective activity container, and displays a set of controls (e.g., a menu) for performing various testing actions according to the respective selected activities. For instance, the illustrated menu enables the user to set the respective activity as a breakpoint (i.e., causing a suspension of execution of the workflow upon reaching the respective activity), to execute the selected activity, to execute all activities preceding the selecting activity, to execute all activities following the selected activity, etc.

In some embodiments, the menu comprises a set of items/controls 58 for configuring mocking according to the selected activity. Mocking herein refers to replacing a target activity or group of activities with a substitute activity/group, so that the substitute activity/group is executed in place of the original target activity/group during workflow testing. Stated otherwise, the substitute activity(ies) is/are used as a mock or stand-in for the respective original activities, for testing purposes. The activity or group of activities replaced with mock are herein deemed the mock target. Mocking may be used for instance in situations where the developer wants to test only a part A of a workflow, which relies on input produced by a part B of the respective workflow. In such situations, mocking part B (i.e., replacing part B by a substitute activity) may provide an alternative input to part A for testing purposes.

Mock controls 58 may include an item which, when invoked by a user, causes mocking of the currently selected activity. See, for instance, menu item 'Mock Activity' in FIG. 8, which sets the currently selected activity/group of activities as a mock target. An alternative mock control 58 may set another part of the respective workflow as the mock target. For instance, exemplary menu item 'Surround with mock' in FIG. 8 may cause mocking of an activity/group of activities providing an input to, and/or processing an output of the currently selected activity.

Figure 9:
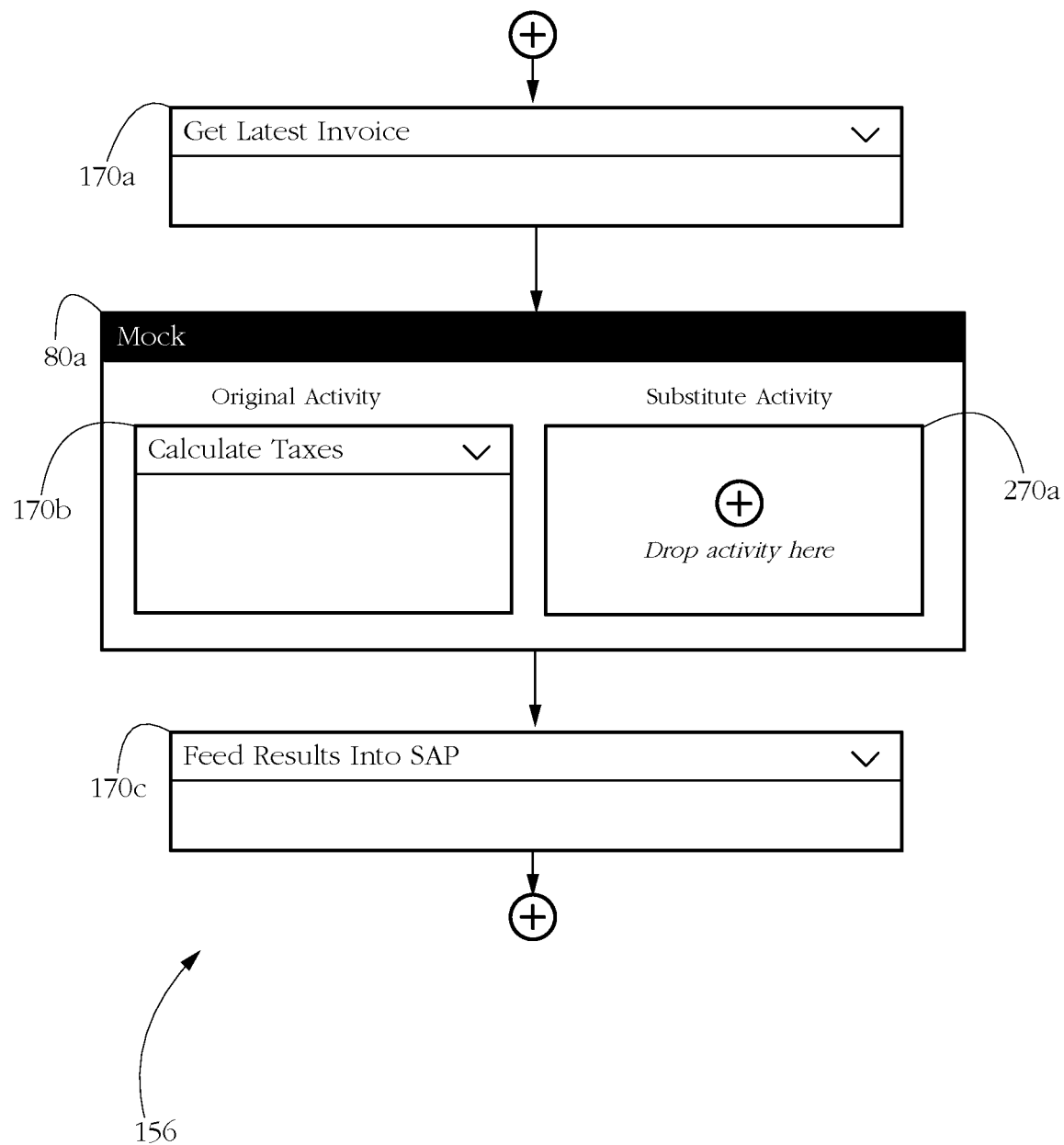
FIG. 9 shows an exemplary graphical representation of a mock workflow comprising a mocked activity according to some embodiments of the present invention.

In some embodiments, invoking mock control(s) 58 (e.g., clicking on one of the respective menu items illustrated in FIG. 8) changes the appearance of the robot testing interface to indicate that mock workflow 156 now comprises mocking. FIG. 9 shows an exemplary view displayed by the robot testing interface when mocking is activated, according to some embodiments of the present invention. Mock workflow 156 now shows a mock interface/container 80*a* co-displaying a symbol for the mock target (i.e., activity or group of activities currently being mocked—activity container 170*b* in the example of FIG. 9) and a symbol for the substitute activity(ies) (i.e., activity or group of activities used to mock the target activity—activity container 270*a* in FIG. 9). Co-displaying herein encompasses any manner of simultaneously displaying an indicator of the mock target activity and an indicator of the respective substitute activity.

In addition to co-display, some embodiments may add visual elements suggesting a substitution relationship between the mock target and respective substitute activity(ies). Other visual elements may help the developer identify the mock target, i.e., exactly which activities are substituted with mock for the current testing purposes. Such visual aids may facilitate RPA testing and debugging by making such activities more user-friendly and intuitive and therefore more accessible to non-technical developers. In the example of FIG. 9, co-displaying comprises showing containers 170*b* and 270*a* in proximity to each other (side by side), within the same container 80*a*. To visually suggest the scope of mocking, containers 170*b* and 270*a* may be rendered using the same size, shape, color scheme, and/or font, in contrast to the visual appearance of other activity containers shown on screen. Text labels as illustrated may further explain the relationship between target and substitute activities.

Figure 10:
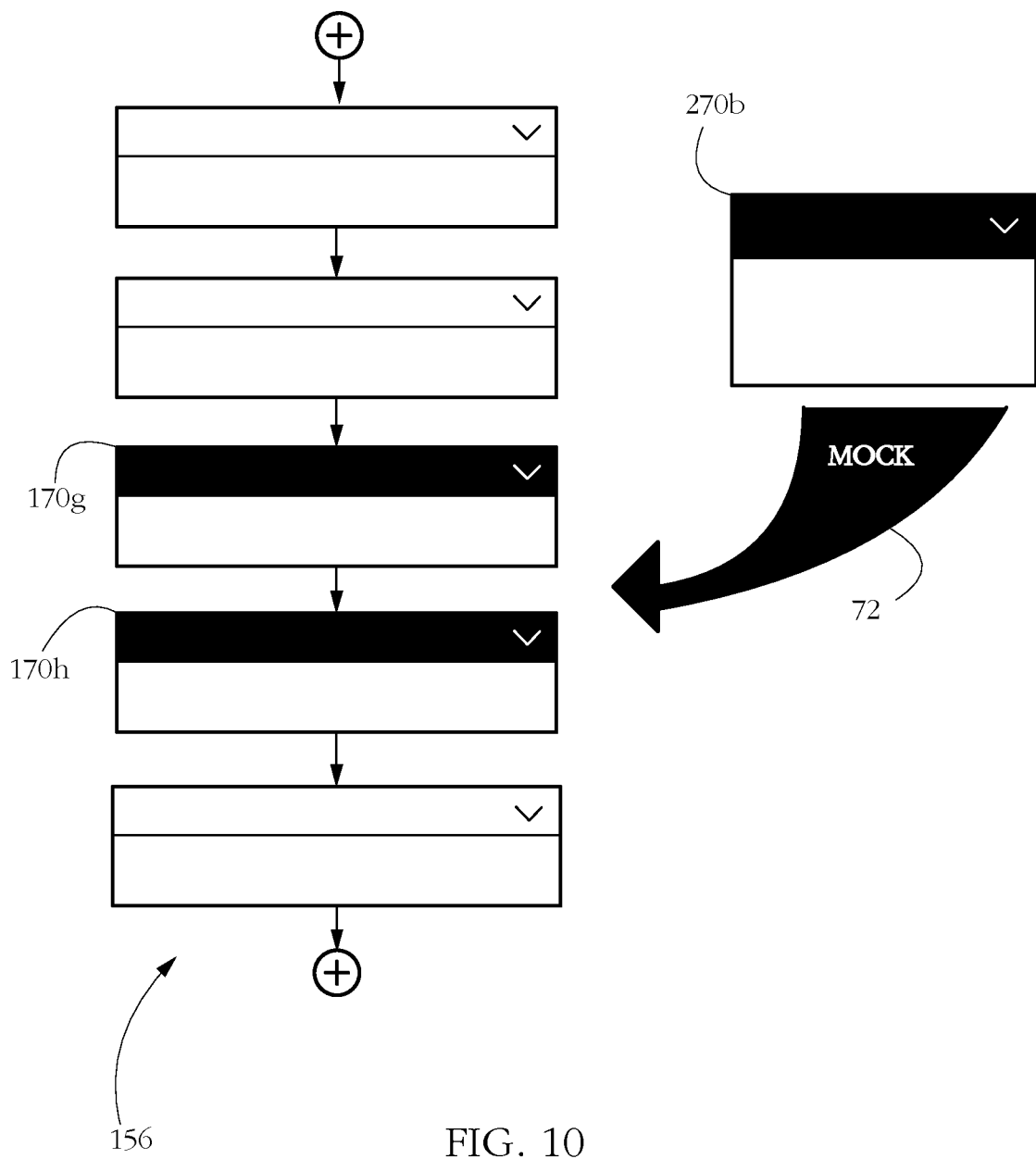
FIG. 10 shows another exemplary graphical representation of a mock workflow wherein a target group of activities is mocked according to some embodiments of the present invention.

An alternative exemplary co-display of the mock target and respective substitute activity is shown in FIG. 10, wherein a substitute activity represented by container 270*b* is used to mock a sequence of activities represented by containers 170*g-h*. In this example of co-display, the scope of mocking is indicated by having the target containers 170*g-h* highlighted with respect to the rest of activities of mock workflow 156. Substitution is further suggested using exemplary visual aids such as an arrow 72.

Figure 11:
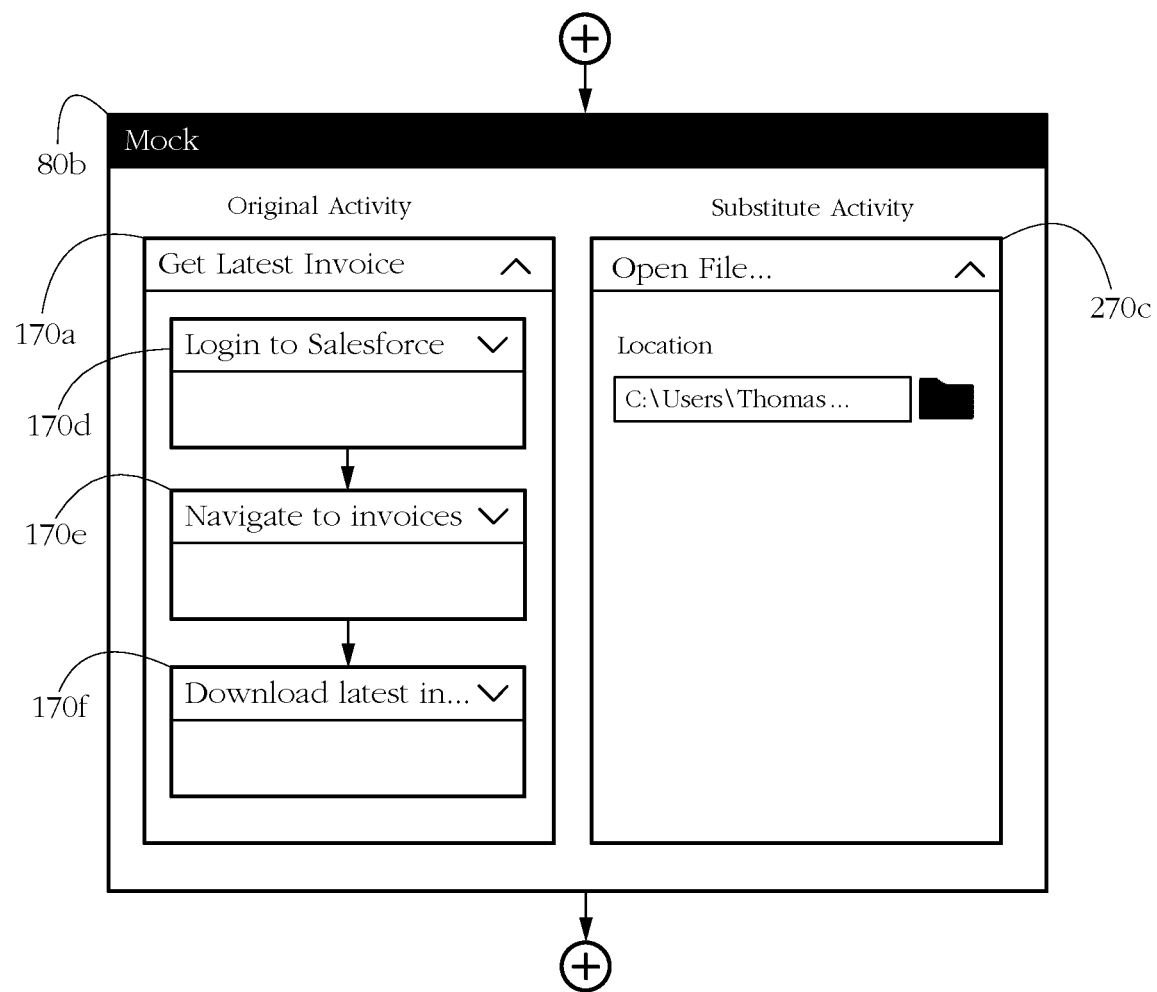
FIG. 11 shows another example of a mock workflow comprising a mocked activity group according to some embodiments of the present invention.

FIG. 11 shows yet another exemplary view of a mock workflow fragment. Container 170*a* symbolizes a subsequence of activities 170*d-e-f* collectively substituted (mocked) by a substitute activity symbolized by container 270*c*. To visually suggest the scope of mocking, the mock target (i.e., container 170*a*) and respective substitute (container 270*c*) are deliberately rendered side by side, horizontally aligned, and having the same vertical size.

FIGS. 12-A-B show an exemplary sequence of steps executed by RPA design application 30 according to some embodiments of the present invention. A step 302 exposes a robot design interface, e.g. interface 50 illustrated in FIG. 6. In response to the user's selecting a workflow (step 304), a step 306 receives user input indicating the user's intention to test the respective workflow. Step 306 may comprise, for instance, detecting that the user has selected the 'Create Test Case' menu item in FIG. 6. In response, some embodiments may create a mock workflow comprising a duplicate of the workflow that the user has selected for testing. Step 308 may further comprise displaying a visual representation of the mock workflow, possibly within a separate GUI window/robot testing interface, or in a separate region of robot design interface 50. For an exemplary mock workflow, please see item 156 in FIG. 8 and associated description above.

Next, RPA design application 30 may receive user input configuring various aspects of the respective test. For instance, in a step 314, application 30 may receive a user input selecting an RPA activity (or group of activities) from mock workflow 156. See e.g., selected activity 170*b* in FIG. 8. A further step 315 may receive another user input indicating a configuration option for the selected activity. Step 315 may comprise for instance detecting that the user has clicked inside an activity container or that the user has selected an option from a menu as illustrated in FIG. 8. The user-selected configuration option may configure the respective activity. In one such example wherein the selected activity comprises filling in a form field, an exemplary configuration option is changing the content of the respective form field. In another example wherein the selected RPA activity comprises clicking on a UI element (e.g., a button, a hyperlink), a configuration option may comprise editing the selector identifying the respective UI element.

Other configuration options received in step 315 may comprise configuring a test parameter according to the respective selected RPA activity. For instance, the user may click a menu item (see FIG. 8) which, when invoked, sets an execution breakpoint at the selected RPA activity. When the input received in step 315 indicates a user's intent to configure mocking (for instance in response to the user's clicking on a mock control 58 in FIG. 8), application 30 may execute a subsequence of steps detailed in FIG. 12-B. Otherwise, a step 318 may configure the selected test activity according to the respective user input. A detailed account of step 318 goes beyond the scope of the present description; an artisan may understand that configuring the selected activity and/or a software testing parameter in situations which do not involve mocking may proceed according to any method known in the art.

When the user has indicated an intention to use mocking (step 316 returns a yes, see e.g., checkmark in FIG. 7), in a step 322 (FIG. 12-B) application 30 may select a mock target according to the respective user input. The mock target comprises a subset of activities which will be substituted for testing purposes. In some embodiments, application 30 identifies the mock target with the currently selected RPA activity(ies). For instance, in the example illustrated in FIG. 8, clicking on 'Mock Activity' causes RPA design application to set the currently selected activity (item 170*b*, 'Calculate Taxes') as mock target.

In some embodiments, the mock target may comprise a set of activities providing an input and/or processing an output of the currently selected RPA activity. For instance, the mock target may include an RPA activity immediately preceding and/or an activity immediately following the currently selected RPA activity within mock workflow 156. In one such example also with reference to FIG. 8, clicking on 'Surround with Mock' may cause application 30 to set item 170*a* ('Get Latest Invoice' activity group) as the mock target.

A step 324 may expose a mock configuration interface enabling the user to configure mocking options/parameters. See for instance mock interfaces 80*a-b* in FIGS. 9 and 11, respectively. A further step 326 may invite the user to indicate a substitute activity or group of activities to replace the mock target for testing purposes. In some embodiments, the user may select a substitute activity from a dedicated activity menu, e.g., from a submenu of ribbon 52 (FIG. 6). Some embodiments allow the user to drag and drop a selected activity into an activity container exposed by the mock interface (see e.g., container 270*a* in FIG. 9). Step 326 may thus receive user input indicating a selected substitute RPA activity.

In a step 328, application 30 may co-display a symbol of the mock target and an symbol of the selected substitute activity, for instance as side-by-side activity containers 170*a* and 270*c* in FIG. 11. Other examples of co-display are shown in FIGS. 9-10. A further step 330 may configure various parameters of the substitute activity according to input received from the user. Using the example illustrated in FIG. 11 wherein the substitute activity comprises opening a disk file, step 330 may comprise indicating a disk location of the respective file, etc. Configuration options are typically activity-specific and are outside of the scope of the current disclosure.

When the user has finished configuring mocking parameters/options (a step 332 returns a YES), in a step 334 some embodiments modifies the respective mock workflow by replacing the mock target with the indicated substitute activity(ies), and proceeds to a step 310 (FIG. 12-A) to determine whether the user has finished configuring the current mock workflow. When no, application 30 may re-execute the sequence described above starting with step 314, for instance to configure another mock target etc. In some embodiments, a single mock workflow may comprise multiple instances of mocking.

When a user input indicates that the user has finished configuring the current mock workflow, a step 312 may output a test RPA script comprising a computer-readable specification of a software robot configured to run the respective mock workflow. Some embodiments further execute the respective script on the local, thus effectively testing the respective robot. Alternatively, the respective RPA script may be delivered to other RPA hosts for execution.

Figure 13:
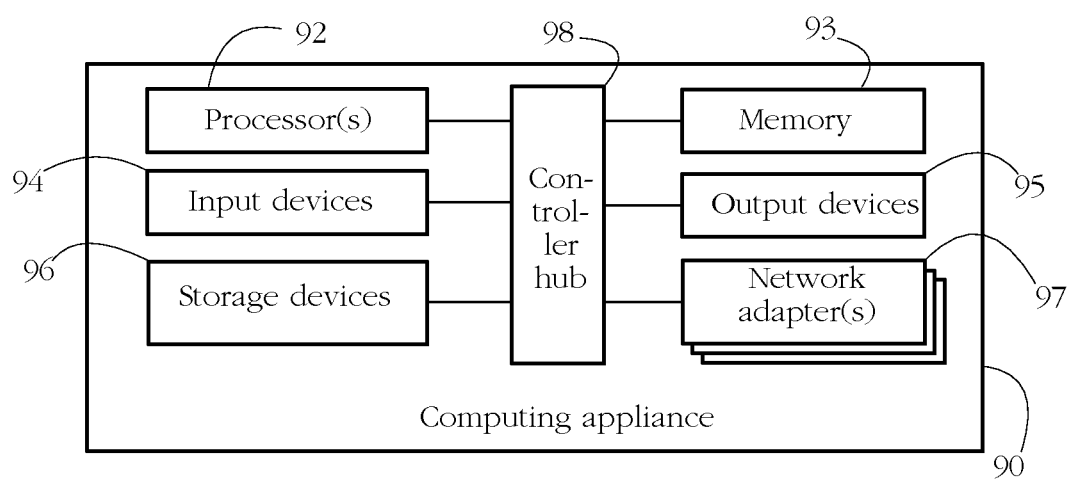
FIG. 13 shows an exemplary hardware configuration of a computing appliance programmed to execute some of the methods described herein.

FIG. 13 shows an exemplary hardware configuration of a computing appliance 90 programmed to execute some of the methods described herein. Appliance 90 may represent any of RPA host platforms 20*a-e* in FIG. 3. The illustrated appliance is a personal computer; other computing devices such as servers, mobile telephones, tablet computers, and wearable computing devices may have slightly different configurations. Processor(s) 92 comprise a physical device (e.g. microprocessor, multi-core integrated circuit formed on a semiconductor substrate) configured to execute computational and/or logical operations with a set of signals and/or data. Such signals or data may be encoded and delivered to processor(s) 92 in the form of processor instructions, e.g., machine code. Processor(s) 92 may include a central processing unit (CPU) and/or an array of graphics processing units (GPU).

Memory unit 93 may comprise volatile computer-readable media (e.g. dynamic random-access memory—DRAM) storing data and/or instructions accessed or generated by processor(s) 92 in the course of carrying out operations. Input devices 94 may include computer keyboards, mice, and microphones, among others, including the respective hardware interfaces and/or adapters allowing a user to introduce data and/or instructions into appliance 90. Output devices 95 may include display devices such as monitors and speakers among others, as well as hardware interfaces/adapters such as graphic cards, enabling the respective computing device to communicate data to a user. In some embodiments, input and output devices 94-95 share a common piece of hardware (e.g., a touch screen). Storage devices 96 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 97 include mechanical, electrical, and signaling circuitry for communicating data over physical links coupled to an electronic communication network (e.g, FIG. 3) and/or to other devices/computer systems. Adapter(s) 97 may be configured to transmit and/or receive data using a variety of communication protocols.

Controller hub 98 generically represents the plurality of system, peripheral, and/or chipset buses, and/or all other circuitry enabling the communication between processor(s)

92 and the rest of the hardware components of appliance 90. For instance, controller hub 98 may comprise a memory controller, an input/output (I/O) controller, and an interrupt controller. Depending on hardware manufacturer, some such controllers may be incorporated into a single integrated circuit, and/or may be integrated with processor(s) 92. In another example, controller hub 98 may comprise a northbridge connecting processor 92 to memory 93, and/or a southbridge connecting processor 92 to devices 94-97.

A skilled artisan will appreciate that the particular illustrated look, design, and contents of user interfaces and menus, the name/label and ordering of menu items, etc., are given only as examples and thus not meant to limit the scope of the present invention. It will also be apparent to one of ordinary skill in the art that aspects of the invention as described above may be implemented in various forms of software, firmware, and hardware, or a combination thereof. For example, certain portions of the invention may be described as specialized hardware logic that performs one or more functions. This specialized logic may include an application specific integrated circuit (ASIC) or a field programmable gate array (FPGA). The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

The exemplary systems and methods described above facilitate the design and testing of RPA robots by making such activities more accessible and attractive to developers who lack a formal programming background. Robot testing may be particularly challenging in the case of complex projects which may involve hundreds of activities and multiple target documents. Some conventional RPA development environments allow a user to test an entire workflow and/or individual activities. However, selectively testing arbitrary chunks of the respective workflow may be technically challenging. Furthermore, constructing test data specifically for testing various aspects of an RPA activity or group of activities typically requires a level of programming expertise that is expected to exceed that of a regular user.

Some embodiments explicitly address such shortcomings by employing activity mocking to facilitate RPA testing. Mocking herein denotes replacing a specific set of RPA activities of a workflow with a substitute activity (or activity sequence) for the purpose of testing. The respective substitute activity(ies) are configured to provide substitute input data to a set of test target activities of the workflow. Mocking therefore enables testing of the test target activities independently of the rest of the respective workflow.

Such mocking is especially useful when a part of the workflow is unavailable for testing and/or comprises activities whose testing would require data which is confidential, expensive, or technically difficult to obtain. In one such example, a workflow comprises a sequence of activities as illustrated in FIG. 8, comprising obtaining an invoice, calculating taxes due on the respective invoice, and saving a result of the calculation into an SAP® data management system. In the illustrated example, obtaining the invoice (activity container 170a) further comprises remotely logging into an accounting database, identifying the most recent invoice, and downloading it. However, the tester might not have the credentials to log into the accounting database, or the respective database server may be currently down. Therefore, activity 170d is unavailable during testing. A situation like this may make testing subsequent activities, such as calculating taxes (activity container 170b in FIG. 8) impossible without substantial effort by the developer.

In contrast, some embodiments allow the developer to mock the activities that are unavailable, i.e., seamlessly replace them with substitute activities without affecting the rest of the workflow. For instance, the developer may mock the entire activity block 170a with an 'Open File' substitute activity as illustrated in FIG. 11. Such mocking may replace the output of block 170a with the content of a disk file indicated by the developer, enabling an easy testing of the 'Calculate Taxes' activity block.

Some embodiments provide a set of intuitive tools for implementing mocking directly within a robot design interface used for developing the respective workflow. For instance, the user may click to select a set of activities as a mock target or select a set of activities for testing using a mock input and/or output. See e.g., illustrative mock options 58 in FIG. 8.

In a conventional software testing approach, the developer would need to prepare test data/test input for the test target activity by using additional software tools and/or by text-based editing of source code. In contrast, some embodiments allow setting up test cases and preparing test input directly in the same robot design interface, without requiring knowledge of other software or coding. For instance, some embodiments allow the developer to specify a set of substitute activities using the same design tools as those used to design the robot itself. As illustrated in FIG. 9, substitute activities may be configured by using intuitive tools such as activity menus and/or drag-and-drop. This allows the developer to produce customized test input by constructing a substitute sequence of RPA activities to produce the respective test input, instead of relying on non-RPA tools for the job. Stated otherwise, knowledge and command of the robot design interface is sufficient for configuring the robot and testing it too.

Some embodiments further facilitate mocking by providing an intuitive, user friendly mock configuration interface oriented towards non-technical users. For instance, some embodiments co-display the mock target activities and respective substitute activities. Seeing the mock in parallel to the original activity may substantially facilitate understanding of how the mock is being used while creating a test case. For instance, a co-display as used by some embodiments may intuitively reveal the extent/scope and results of mocking. Examples of co-display are illustrated in FIGS. 9-10-11 and comprise showing the mock target and substitute activities side-by-side within the same container, in the greater context of the workflow currently being tested.

To further facilitate testing, in some embodiments mocking comprises automatically creating a separate mock workflow comprising a duplicate of the original. Mocking and testing are then non-invasive, in the sense that they are carried out on the mock workflow, without affecting the original workflow. This affords the developer freedom to experiment with various mocking parameters and/or testing data, while having the option to revert to the original workflow at any time.

It will be clear to one skilled in the art that the above embodiments may be altered in many ways without departing from the scope of the invention. Accordingly, the scope of the invention should be determined by the following claims and their legal equivalents.

What is claimed is:

1. A robotic process automation (RPA) method comprising employing at least one hardware processor of a computer system to:
    select an RPA workflow for testing, the RPA workflow comprising a sequence of robotic activities wherein a first activity provides an input to a second activity;
    in response to receiving a user input selecting a target subsequence of activities from the RPA workflow, the target subsequence including the first activity, create a mock workflow for the RPA workflow, wherein the target subsequence of activities of the RPA workflow is replaced in the mock workflow with a substitute activity configured to supply a mock input to the second activity;
    in response to creating the mock workflow, expose an activity configuration interface enabling a user to configure parameters of the substitute activity while co-displaying a symbol representing the substitute activity with a symbol representing the target subsequence of activities; and
    output a computer-readable encoding of a test robot configured to execute the mock workflow, wherein executing the test robot comprises testing the RPA workflow for errors.

2. The method of claim 1, further comprising employing the at least one hardware processor, in response to creating the mock workflow, to display a graphical representation of the mock workflow to a user of the computer system.

3. The method of claim 2, wherein the graphical representation of the mock workflow comprises a plurality of symbols, each symbol of the plurality of symbols representing a distinct activity of the mock workflow, and wherein co-displaying comprises drawing a container to enclose both the symbol representing the substitute activity and the symbol representing the target subsequence of activities.

4. The method of claim 2, wherein co-displaying comprises displaying the symbol representing the target subsequence of activities in proximity to the symbol representing the substitute activity.

5. The method of claim 2, wherein co-displaying comprises displaying the symbol representing the target subsequence of activities aligned with the symbol representing the substitute activity.

6. The method of claim 2, wherein co-displaying comprises rendering the symbol representing the target subsequence of activities and the symbol representing the substitute activity as having substantially the same size.

7. The method of claim 2, wherein the symbol representing the target subsequence of activities further comprises another plurality of symbols, each symbol of the other plurality of symbols representing a distinct activity of the target subsequence of activities.

8. The method of claim 1, further comprising employing the at least one hardware processor to execute the test robot.

9. A computer system comprising at least one hardware processor configured to:
    select an RPA workflow for testing, the RPA workflow comprising a sequence of robotic activities wherein a first activity provides an input to a second activity;
    in response to receiving a user input selecting a target subsequence of activities from the RPA workflow, the target subsequence including the first activity, create a mock workflow for the RPA workflow, wherein the target subsequence of activities of the RPA workflow is replaced in the mock workflow with a substitute activity configured to supply a mock input to the second activity;
    in response to creating the mock workflow, expose an activity configuration interface enabling a user to configure parameters of the substitute activity while co-displaying a symbol representing the substitute activity with a symbol representing the target subsequence of activities; and
    output a computer-readable encoding of a test robot configured to execute the mock workflow, wherein executing the test robot comprises testing the RPA workflow for errors.

10. The computer system of claim 9, wherein the at least one hardware processor is further configured, in response to creating the mock workflow, to display a graphical representation of the mock workflow to a user of the computer system.

11. The computer system of claim 10, wherein the graphical representation of the mock workflow comprises a plurality of symbols, each symbol of the plurality of symbols representing a distinct activity of the mock workflow, and wherein co-displaying comprises drawing a container to enclose both the symbol representing the substitute activity and the symbol representing the target subsequence of activities.

12. The computer system of claim 10, wherein co-displaying comprises displaying the symbol representing the target subsequence of activities in proximity to the symbol representing the substitute activity.

13. The computer system of claim 10, wherein co-displaying comprises displaying the symbol representing the target subsequence of activities aligned with the symbol representing the substitute activity.

14. The computer system of claim 10, wherein co-displaying comprises rendering the symbol representing the target subsequence of activities and the symbol representing the substitute activity as having substantially the same size.

15. The computer system of claim 10, wherein the symbol representing the target subsequence of activities further comprises another plurality of symbols, each symbol of the other plurality of symbols representing a distinct activity of the target subsequence of activities.

16. The computer system of claim 9, wherein the at least one hardware processor is further configured to execute the test robot.

17. A non-transitory computer-readable medium storing instructions which, when executed by at least one hardware processor of a computer system, cause the computer system to:
    select an RPA workflow for testing, the RPA workflow comprising a sequence of robotic activities wherein a first activity provides an input to a second activity;
    in response to receiving a user input selecting a target subsequence of activities from the RPA workflow, the target subsequence including the first activity, create a mock workflow for the RPA workflow, wherein the target subsequence of activities of the RPA workflow is replaced in the mock workflow with a substitute activity configured to supply a mock input to the second activity;
    in response to creating the mock workflow, expose an activity configuration interface enabling a user to configure parameters of the substitute activity while co-displaying a symbol representing the substitute activity with a symbol representing the target subsequence of activities; and output a computer-readable encoding of a test robot configured to execute the mock workflow, wherein executing the test robot comprises testing the RPA workflow for errors.

\* \* \* \* \*